United States Patent
Gallant et al.

(10) Patent No.: US 9,638,241 B2
(45) Date of Patent: May 2, 2017

(54) AIRCRAFT COMPRISING A LINK ROD ONE PART OF WHICH IS MADE OF COMPOSITE

(75) Inventors: Guillaume Gallant, Lareole (FR); Julien Guillemaut, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 708 days.

(21) Appl. No.: 13/811,802

(22) PCT Filed: Jul. 18, 2011

(86) PCT No.: PCT/FR2011/051714
§ 371 (c)(1),
(2), (4) Date: Jan. 23, 2013

(87) PCT Pub. No.: WO2012/010789
PCT Pub. Date: Jan. 26, 2012

(65) Prior Publication Data
US 2013/0118301 A1    May 16, 2013

(30) Foreign Application Priority Data
Jul. 23, 2010   (FR) ...................................... 10 56074

(51) Int. Cl.
F16C 7/00     (2006.01)
F16C 7/02     (2006.01)
G01D 21/00    (2006.01)

(52) U.S. Cl.
CPC ................ F16C 7/02 (2013.01); F16C 7/026 (2013.01); G01D 21/00 (2013.01); *Y10T 29/49826* (2015.01); *Y10T 74/2144* (2015.01)

(58) Field of Classification Search
CPC ...... F16C 7/00; F16C 7/02; F16C 7/08; F16C 7/026; B64C 13/30; B64D 2027/268; Y10T 74/2142; Y10T 74/2144; Y10T 74/2159
See application file for complete search history.

(56) References Cited

U.S. PATENT DOCUMENTS

| 4,295,388 | A | * | 10/1981 | Mialon | F16C 7/02 29/469.5 |
| 4,659,069 | A | * | 4/1987 | Odobasic | B64C 25/64 244/104 R |
| 5,318,374 | A | | 6/1994 | Rumberger | |
| 8,342,770 | B2 | * | 1/2013 | Soulier | B64D 27/26 403/150 |
| 2005/0230528 | A1 | * | 10/2005 | Gay | B64C 3/34 244/34 R |
| 2010/0122606 | A1 | * | 5/2010 | Stephan | B29C 70/86 74/579 R |

FOREIGN PATENT DOCUMENTS

| DE | 33 46 061 | 7/1985 | |
| EP | 0 012 090 | 6/1980 | |
| EP | 1 870 196 | 12/2007 | |
| FR | 2 569 817 | 3/1986 | |
| WO | WO 2009024470 A1 * | 2/2009 | ............. B64D 27/26 |

OTHER PUBLICATIONS

International Search Report for PCT/FR2011/051714 mailed Oct. 31, 2011.

* cited by examiner

*Primary Examiner* — Thomas Diaz
(74) *Attorney, Agent, or Firm* — Nixon & Vanderhye P.C.

(57) ABSTRACT

The link for an aircraft comprises at least two portions respectively made of metal and of composite material together forming a common section of a middle segment of the link in a plane perpendicular to a longitudinal direction of the link.

19 Claims, 4 Drawing Sheets

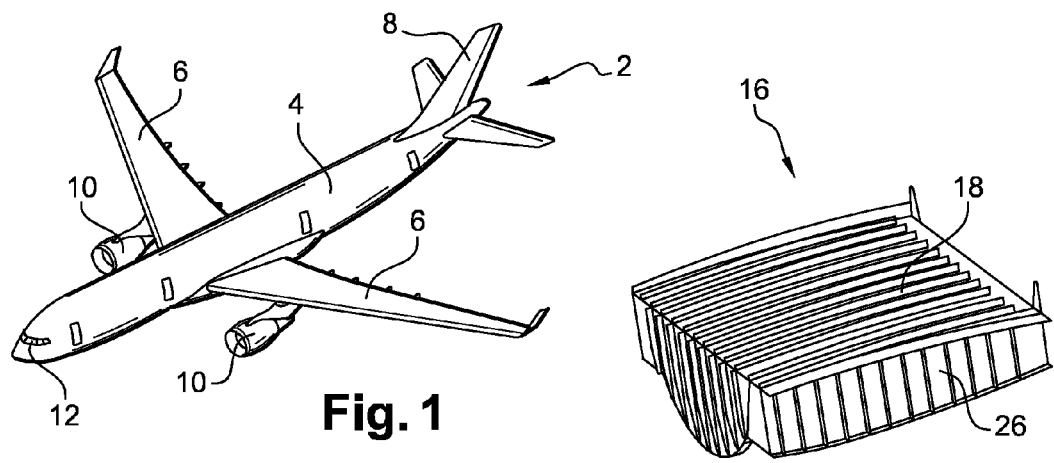
Fig. 1
Fig. 2
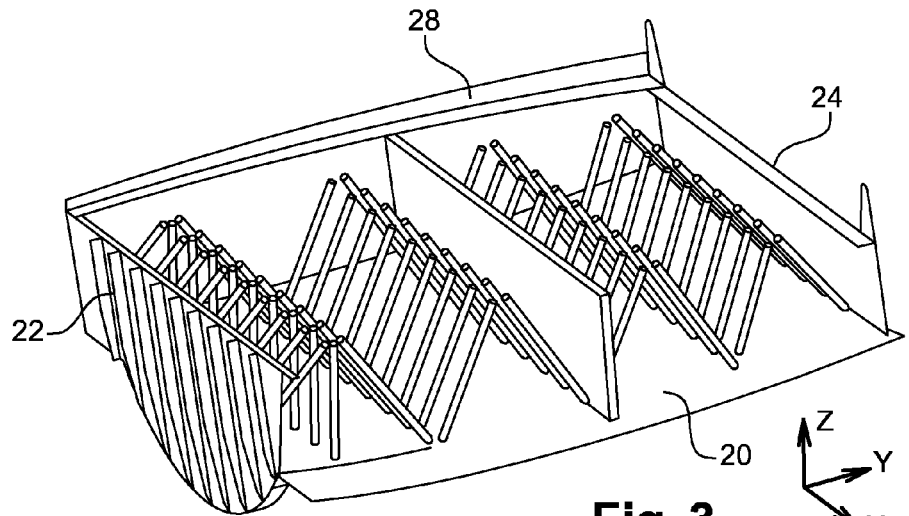
Fig. 3
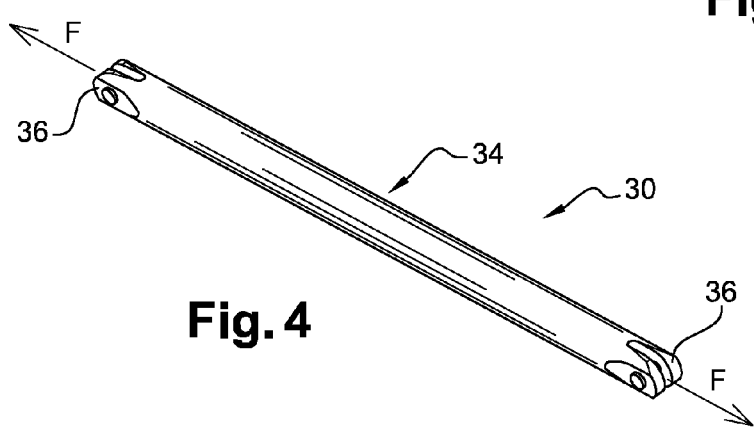
Fig. 4

AIRCRAFT COMPRISING A LINK ROD ONE PART OF WHICH IS MADE OF COMPOSITE

This application is the U.S. national phase of International Application No. PCT/FR2011/051714 filed 18 Jul. 2011 which designated the U.S. and claims priority to FR 1056074 filed 23 Jul. 2010, the entire contents of each of which are hereby incorporated by reference.

FIELD OF THE INVENTION

The invention relates to the structure of aircraft, and in particular to links forming portions of that structure.

BACKGROUND OF THE INVENTION

It is common practice for an airplane to have links forming structural parts. This applies for example in jet engine masts, in landing gear, in floor structures, in wing box ribs, etc. These links are subjected to traction or compression forces and they are sometimes associated with one another in other to form a trellis type structure. Nevertheless, in a structure of that type, as in other arrangements, it often happens that each link is subjected mainly to a single kind of stress, namely pure traction or pure compression.

The dimensioning of a structural zone of an airplane, e.g. a trellis of links, must satisfy specific specifications associated with the mechanical strength of each link relative to predetermined stress, with its stiffness, and with its size. In general, it is desirable to minimize the weight and the cost of such links, while complying with the specifications. More particularly, it is desirable under such circumstances to minimize the weight of a link that is subjected to mechanical stress of predetermined magnitude.

In this context, it is known to use links made of metal or else links made of composite material. Each of those technologies has its advantages and its drawbacks.

Consideration is given initially to a link that is stressed purely in traction. Its dimensioning is associated directly with the level of its elongation. If the link is made of metal, it must be ensured that it is not subjected to plastic deformation prior to reaching limit loads, and that it does not break prior to reaching extreme loads. If the link is made of composite material, it must be ensured that it satisfies the damage-tolerance criterion that is determined by the acceptable level of elongation under extreme loads.

By way of example, consideration is given to a traction force of 20 (metric) tonnes (t) or 200,000 newtons (N). The behavior of a link made of aluminum of reference 2024T42 is compared with the behavior of a pre-impregnated composite material link having carbon fibers with an intermediate Young's modulus and oriented in the 50/20/20/10 mode, i.e. 50% at 0° relative to the reference direction, 20% at −45°, 20% at 45°, and 10% at 90°. In operation, the metal link is subjected to greater elongation than the composite link. Thus, the section of the metal link may be selected as being smaller than the section of the composite link. Nevertheless, the metal link is of greater density (relative density 2.7) than the composite link (relative density 1.6). For example, if a composite material link and a metal link present substantially identical performance in traction, the composite material link is only about 22% lighter than the metal link in spite of having density that is 41% smaller. It is the damage tolerance effect that makes the composite material link less effective, since it operates with a rather low level of elongation. No consideration is given here to the fatigue criterion, but it is penalizing for the metal link.

Consideration is now given to a link that is subjected to pure compression. Depending on its length, its dimensioning may be associated either with its section (as applies to a link that is short, with its section being dimensioned as a function of elongation), or else with its second moment of area or "inertia" (as applies to a link that is long, with its inertia being dimensioned as a function of buckling). As well as verifying as above that there is no plastic deformation or breaking and also verifying that the damage tolerance criterion is complied with, it is necessary to verify compliance with the buckling criterion for both types of link.

By way of example, consideration is given to short links, i.e. links having a length of 700 millimeters (mm), that are subjected to a compression force of 20 t and that are made respectively out of the same materials as described above. The metal link is subjected to a greater amount of elongation than the composite link. Thus, the section of the metal link may be selected to be 44% smaller than the section of the composite link. However, the metal link is of greater density than the composite link. In the end, for a link that is not dimensioned for buckling (a short link), and with equivalent levels of performance in compression, it is possible for a metal link to be made 5% lighter than a composite link. This difference, which is small in spite of the great difference in densities between the materials, is the result of the damage-tolerance effect that makes the composite link less effective because it is subjected to a relatively small level of elongation.

Consideration is now given to longer links, e.g. links that are 1.8 meters (m) long, and that are subjected to a compression stress of 20 t, and made respectively out of the same materials as above. The Young's modulus of the composite link (89,430 megapascals (MPa)) is slightly greater than that of the metal link (76,500 MPa). With unchanging shape, the bending stiffness (Young's modulus and section modulus) of the composite link is thus slightly more favorable in terms of the buckling criterion than is the bending stiffness of the metal link. Furthermore, the metal link is of greater density than the composite link. This leads to a link that is dimensioned in terms of buckling possibly being 40% lighter when made of composite material than when made of metal. This results mainly from the effect of the difference in density. Under such circumstances, the composite link can be said to be fully effective since it is does not need to work at a high level of elongation.

Thus, when a link is dimensioned in terms of buckling under compression stress, it is more effective when made of composite material than of metal. The weight saving achieved is close to the density saving that corresponds to the materials. In contrast, when the link is not dimensioned in terms of buckling (either for traction stress, or for compression stress when the link is short), composite material is not so effective because of the damage-tolerance criterion, it being understood that the working level of elongation for a composite link is much less than for a metal link.

Both of those two solutions are therefore imperfect.

OBJECT AND SUMMARY OF THE INVENTION

An object of the invention is to propose a link that provides a better compromise in terms of cost, of weight, and of mechanical performance.

To this end, the invention provides a link for an aircraft, the link comprising at least two portions respectively made of metal and of composite material together forming a middle segment of the link with both being present in any section of the middle segment in a plane perpendicular to a longitudinal direction of the link.

Thus, the hybrid link of the invention takes advantage of the properties of metal and of composite material, combining them to give the link very good mechanical performance together with cost and weight that are reasonable. In particular, it can be ensured that the composite material, i.e. the low density material, is caused to work at a high level of elongation so as to avoid being limited by the damage-tolerance criterion.

Preferably, the two portions are arranged without mutual contact, in particular in the middle segment.

Thus, there is no problem of corrosion as a result of two materials coexisting within the link.

Preferably, the two portions are arranged spaced apart and facing each other in the middle segment.

Thus, one of the portions provides the other with protection against impacts. The gap that exists between the two portions allows the first to deform under the effect of an impact to some extent without the other portion deforming. This same gap also makes it easier for the protected portion to deform, and thus leaves traces that an impact has occurred, which traces are visible in its outside face in the form of an indentation. This trace of an impact is thus easily observed, in particular visually, when performing an inspection.

Advantageously, one of the portions extends inside the other portion.

This serves to protect it against impacts, in particular.

Preferably, the composite material portion extends inside the metal portion.

Advantageously, each of the two portions is in the form of a body of revolution about a longitudinal axis of the link.

Provision may be made for the inner portion to be hollow.

In contrast, provision may also be made for the inner portion to be solid.

In a variant, the link comprises a material that extends between the inner portion and the outer portion and that is suitable for limiting transmission of deformation from one to the other.

The material may be an elastomer or it may be a rigid foam.

Advantageously, the two portions are coaxial.

This procures a symmetrical distribution of the mechanical properties of the link around the longitudinal axis or relative thereto, depending on the shape of the link.

Advantageously, at least one of the portions forms a tube, with the portions preferably constituting respective tubes.

Thus, the weight and the density of the link remain low, which is particularly suitable for installing on board an aircraft. The tube(s) nevertheless provide(s) good mechanical properties, in particular in terms of buckling strength.

Advantageously, the link includes a spacer interposed between the two portions in a direction that is radial relative to the longitudinal axis of the link.

This part contributes to fastening the two portions to each other while ensuring they do not make mutual contact.

Preferably, the link has at least one end part fastened to the portions without coming directly into contact with either of them.

Thus, whatever the material from which the end part is made, this avoids any problem of corrosion with respect to the materials forming the above-mentioned portions of the link.

The end part is preferably fastened directly to the spacer. In particular, provision may be made for the end part to be screwed onto the spacer. For this purpose, where the end part is a clevis, it presents a threaded inside face which enables it to be screwed onto a cylindrical threaded outside face of the spacer.

Advantageously, the link includes at least one fastener element passing through the two portions and the spacer in a direction that is radial relative to a longitudinal axis of the link.

Preferably, the metal portion is mounted to be slidably movable relative to an end of the link in the longitudinal direction locally away from said end, the link having an abutment against the metal portion sliding in the opposite direction.

Thus, the metal portion can slide when the link is stressed in traction and the traction stresses to which the link is subjected between the two ends are not transmitted to the metal portion. It is only the composite material portion that withstands them. Since the metal portion is not stressed in traction, no fatigue phenomenon occurs.

For example, the metal portion is slidably mounted on the spacer.

Advantageously, the link has an abutment that is prevented by complementary shapes from sliding relative to the portion made of composite material in either of the two opposite longitudinal directions.

This is an arrangement that enables the composite material portion to work in traction and in compression.

Advantageously, the spacer bears axially against the abutment.

Preferably, the abutment bears against a part of the link other than the portion made of composite material via a face that is inclined relative to a longitudinal axis of the link.

This inclined face provides both axial bearing and radial bearing between the part and the abutment, thereby increasing the extent to which they cannot move relative to each other by a wedging effect and also optionally by at least one of these parts being fastened to another portion of the link.

In an embodiment, the part is an end part.

In another embodiment, the part is a nut that is distinct from the end part of the link and that is screwed onto the spacer.

In an embodiment, the link is arranged in such a manner that the composite material portion is subjected in the middle segment to tension stress in the longitudinal direction when the link is at rest.

Since the metal portion is thus prestressed in compression, it takes up a fraction of the traction forces applied to the link without reaching a critical state, whether in terms of static strength of or fatigue strength. The composite portion is thus less loaded when the link is stressed.

The invention also provides an aircraft including at least one link of the invention.

For example, the aircraft includes a plurality of links of the invention together forming a trellis structure.

The invention also provides a method of fabricating a link for an aircraft, wherein at least two portions respectively made of metal and of composite material are assembled together in such a manner that together they form a middle segment of the link, with both being present in any section of the middle segment in a plane perpendicular to a longitudinal direction of the link, the assembly being made in such a manner that the composite material portion presents, in the middle segment, tension stress in the longitudinal direction when the link is at rest.

The invention also provides a method of inspecting a link of the invention, in which method the portion that extends inside the other is the inner portion and the other portion is the outer portion, and it is determined whether an outer face of the outer portion presents an indentation.

As mentioned above, the gap between the protective portion and the protected portion makes it easier for the protective portion to deform under the effect of an impact, and the resulting indentation in its outer face is visible and thus detectable.

Preferably, when the face presents an indentation, the depth of the indentation is determined and compared with a predetermined threshold.

In particular, it is advantageous for this threshold to be selected so that a depth of less than the threshold is taken to be a situation in which the protected portion is considered as being intact, whereas a depth greater than the threshold means that the protected portion has been damaged by the impact.

This method makes it possible, in return, to cause the link to work at a higher level of loading than that which would otherwise be acceptable.

BRIEF DESCRIPTION OF THE DRAWINGS

Other characteristics and advantages of the invention appear further from the following description of various embodiments given as non-limiting examples and with reference to the accompanying drawings, in which:

FIG. 1 is a perspective view of an aircraft of the invention;

FIGS. 2 and 3 are two perspective views of the central wing box of the FIG. 1 aircraft, with the top wall of the box being removed in FIG. 3;

FIG. 4 is a perspective view of one of the links of the FIG. 3 box;

MORE DETAILED DESCRIPTION

Figure 5:
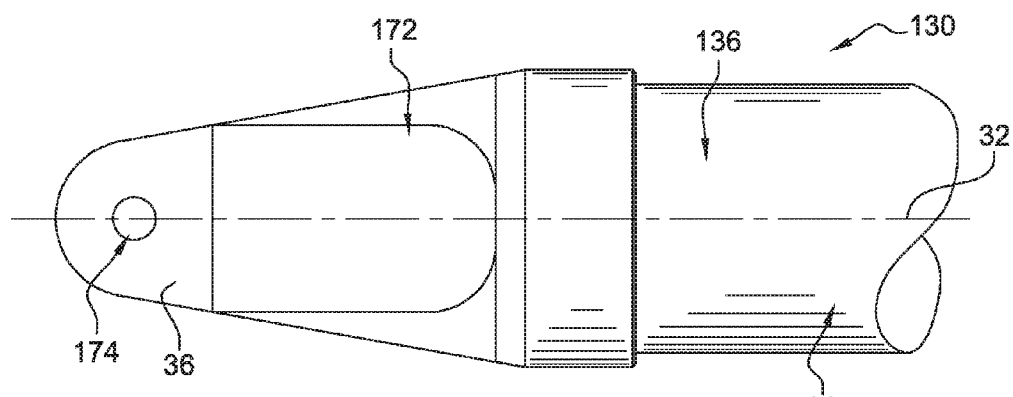
FIGS. 5 and 6 are fragmentary views, respectively in elevation and in longitudinal section, showing the end of the FIG. 4 link.

FIG. 1 shows an aircraft of the invention. In the present example, it is an aerodyne and specifically an airplane 2 having a fuselage 4 and two wings 6. It has a tail 8 and jets 10, there being two jets in this example that are fastened to respective wings. It is an airplane for transporting cargo and/or one or more people. It has a cabin that presents a cockpit 12 and the front of the fuselage 4, to be occupied by at least one pilot.

The airplane 2 has a central wing box 16 as shown in FIGS. 2 and 3. These figures also show a rectangular reference frame XYZ. In this frame of reference, the directions X and Y are horizontal and designate respectively the longitudinal direction and the transverse direction of the fuselage, while the direction Z is the vertical direction.

The box 16 has generally horizontal top and bottom walls 18 and 20, together with vertical walls, namely two side walls 22 and 24, and front and rear walls 26 and 28. These six walls define an enclosure that is occupied in particular by a set of links 30 arranged in a so-called "trellis" configuration. The links are identical to one another and they are distributed in several groups of links, there being eight groups in the example described. The links in each group are coplanar and mutually parallel and they are spaced apart from one another. Each link extends in a plane parallel to the YZ plane. The links are arranged correspondingly from one group to another so that they are distributed in vertical planes parallel to the YZ plane, each of these planes having one link of each group.

The groups of links are inclined in alternation in opposite directions such that the links of the first and second groups converge towards each other on going upwards. The same applies to the links of the third and fourth groups, of the fifth and sixth groups, and of the seventh and eighth groups. Conversely, these links of the second and third groups converge towards each other on going downwards. The same applies to the links of the fourth and fifth groups and of the sixth and seventh groups.

The invention is described herein in the context of such a trellis configuration within the box 16. Nevertheless, the links of the invention could also be used in some other configuration and/or within some other portion of the airplane, for example in a jet engine mast, an undercarriage, a floor structure, or indeed in some other portion of the structure of the airplane.

As shown in FIG. 4, each link 30 is generally of rectilinear elongate shape and presents a main axis 32. The link has a middle body 34 forming the major fraction of the length of the link and extending from one to the other of its axial end portions 36. All of the parts forming the link are generally bodies of revolution about the axis 32, unless specified to the contrary.

Figure 6:
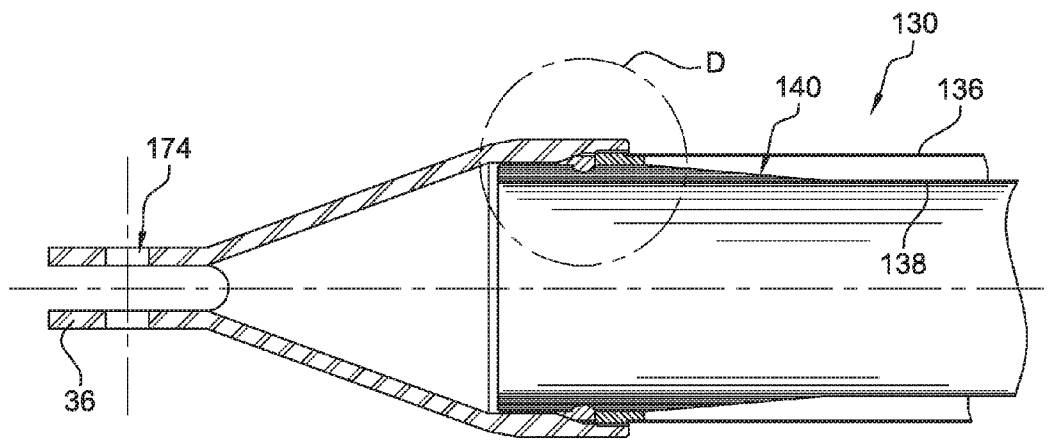
Figure 7:
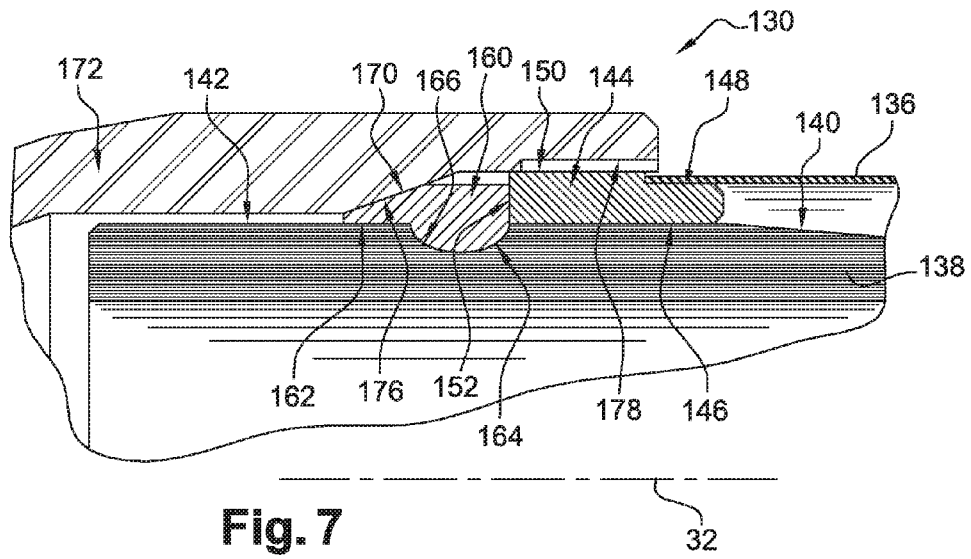
FIG. 7 is a view on a larger scale of a detail D of the FIG. 6 link.

With reference to FIGS. 5 to 7, there follows a description of a first embodiment of the link 130.

The body 34 has a portion 136 made of metal and a portion 138 made of composite material. Specifically, the metal is aluminum such as that known under the reference 2024T42, however it could be aluminum having some other reference, or it could be some other metal. In this example, the composite material is a carbon fiber reinforced plastic (CRFP) material having an epoxy resin matrix. It is a pre-impregnated composite material with carbon fibers having an intermediate Young's modulus and oriented in the 50/20/20/10 mode.

Specifically, the middle body 34 is made up of portions 136 and 138. In the present example, each of these portions is configured in the form of a tube of section that is circular in a plane perpendicular to the axis 32. The tubes are mounted in a concentric coaxial configuration with the composite material tube 138 being housed within the metal tube 136. A gap is left between the inside face of the metal tube and the outside face of the composite tube, in particular in a middle segment of the link, such that they are not in contact with each other and they extend facing each other while being spaced apart. Together these two tubes form the running section of the middle body 34 of the link along the axis 32 in a plane perpendicular thereto. The metal tube 136 forms the covering of the middle body.

The cross-section of the metal covering 136 remains unchanged over its entire length. In contrast, the cross-section of the inner tube 138 differs at its ends from its section in its middle portion. The tube is thicker at its ends. The inside face of the tube remains cylindrical over its entire length. At each end of the tube, going towards the end along the axis 32, the cylindrical outer face in the middle is followed by a frustoconical face 140 that enlarges the total diameter of the tube. The frustoconical face is followed by a cylindrical face 142 of circular cross-section that extends to the free end of the tube. The inner tube 138 thus presents end zones of thickness that is greater than the thickness in its middle portion.

Each end of the link 130 has a spacer 144. The spacer 144 presents a cylindrical inside face 146 of circular section in a plane perpendicular to the axis 32, with the spacer making surface-on-surface contact with the outside face 142, at the edge thereof that is furthest from the free end of the inner tube 138. The spacer presents two cylindrical outside faces 148 and 150 that follow each other in this order going towards the free end of the tube 138. These two faces are of circular section in a plane transverse to the axis 32. The face 148 is smooth, while the face 150 is threaded. The face 148 has a diameter that is smaller than the smallest diameter of the face 150. The spacer presents a rear end face 152 that is plane and perpendicular to the axis 32.

In this example, the metal covering 136 is engaged on the spacer 144 so that its inside face bears with surface-on-surface contact against the outside face 148. The free end of the metal covering comes into axial abutment against a shoulder of the spacer forming the junction between its outer faces 148 and 150.

The end of the link also includes an abutment-forming ring 160 that presents an inside face 162 of cylindrical shape and section that is circular in a plane perpendicular to the axis 32. The ring 160 is mounted on the inner tube 138 so that its face 162 comes into surface-on-surface contact against the face 142. The ring 160 also presents a bead 164 projecting from the face 162 radially towards the axis 32. This bead is received in an annular groove 166 formed in a middle portion of the face 142. In this example, the bead 164 is of semi-elliptical shape in a radial plane, the long axis of the ellipse being parallel to the axis 32 and in alignment with the face 142. In order to enable it to be inserted in the groove, the ring 160 is made up from two or three portions with junctions occupying one or more radial planes relative to the axis 32. The complementary shapes of the bead 164 and the groove 166 ensure that the ring 160 is held stationary relative to the inner tube 138 against mutual sliding in either direction along the axis 32. The ring 160 presents a front face that is plane and perpendicular to the axis 32, which face is in surface-on-surface contact with the face 152 of the spacer 144. It also presents a rear face 170 of frustoconical shape facing away from the middle portion of the link. This face is thus locally inclined relative to the axis 32.

The link also includes a metal clevis 172, made of aluminum in this example, that constitutes the free end in this example. At its free end, the clevis presents a fork configuration that can be seen in FIG. 6, the two tines of the fork having respective orifices 174 pierced therethrough on a common axis so as to enable this end of the link to be hinged to some other part of the airplane about an axis perpendicular to the axis 32.

The clevis 172 presents a threaded inside face 178 enabling it to be screwed onto the face 150 of the spacer. The clevis also has a frustoconical inside face 176 arranged to come into surface-on-surface, inclined bearing contact against the face 170 of the ring 160. This inclined bearing contact thus tends to urge the ring 160 along the axis towards the spacer 144 against which it is in abutment, and radially towards the inner tube 138 so as to hold the bead 164 more firmly in the groove 166.

By being assembled in this way, the spacer 144, the ring 160, the inner tube 138, and the clevis 172 are rigidly fastened to one another. The metal covering 136 is prevented from sliding axially towards the clevis 172 by being in abutment against the shoulder of the spacer 144. It is nevertheless free to slide in the opposite direction relative to all of these parts going away from the shoulder.

It can be seen that the spacer 144 is interposed between the two tubes 136 and 138 in a direction that is radial relative to the axis 32. The ring 160 is interposed between the clevis and the tube 138 in a direction that is radial relative to the axis 132. The clevis 172 is fastened to both tubes without coming into direct contact with either of them. A gap is left between the face 142 of the inner tube 138 and the facing face of the clevis 172. This avoids any problem of corrosion that might arise at contact between the clevis and either of the two tubes.

The spacer 144 may be made of a material that is slippery and/or chemically insulating. The spacer 144 may be made of metal, e.g. of steel or of titanium. If made of titanium, it presents a redox potential that is close to that of the carbon in the composite material of the tube 138 and is therefore unlikely to corrode it. The same applies for the ring 160.

The metal covering 136 is free to slide relative to the composite tube 138 when the link 130 is subjected to axial traction between its two ends 36 as represented by forces F in FIG. 4. Consequently, the metal tube 136 does not work in traction. There therefore cannot be any problem of fatigue therein. The traction force applied to the clevises 172 is transmitted to each end of the spacer 144 and then to the ring 160 and finally to the composite tube 138. It is thus only the composite tube that withstands the traction force within the middle body.

When axial compression stress is exerted on the two clevises 172, the force is transmitted by each clevis both to the spacer 144 via the threaded connection and to the ring 160 via the inclined face 170. The ring 160 transmits the forces directly to the composite tube 138 by compressing it, and the spacer 144 transmits the forces by bearing axially directly against the metal covering 136. Thus, in compression, both tubes are stressed simultaneously in the middle body of the link. The load is thus shared between these two tubes.

Figure 8:
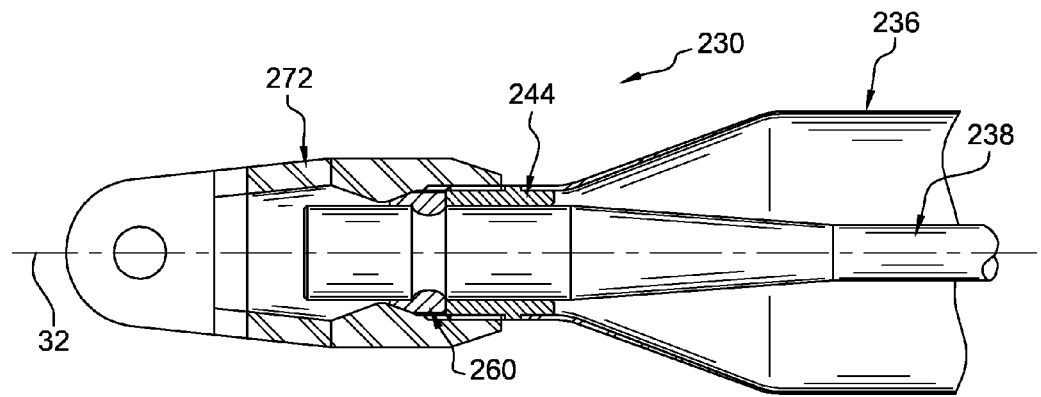
FIGS. 8 to 11 are views analogous to FIG. 6 showing four other embodiments of the link.

With reference to FIG. 8 there follows a description of a second embodiment of the link 230 of the invention. Characteristics that are not described again are common with the first embodiment. The numerical references of analogous elements are increased by 100. The same applies to the subsequent embodiments.

There can be seen the metal outer covering 236 forming a tube. Nevertheless, the tube has a middle portion of cylindrical section that is continued towards the clevis 272 by a segment of frustoconical shape of radius that tapers in that direction. This segment is followed by a cylindrical segment forming the free end of the covering.

The composite portion of the middle body of the link in this embodiment is formed by a solid body such as a rod or a bar 238 that in this example comprises a cylindrical middle segment followed, on going towards the clevis 272, by a frustoconical segment of radius that flares in that direction and that terminates in a free end segment of cylindrical shape and of circular cross-section.

The spacer 244 is once more screwed into the clevis 272 and carries the covering 236 that it allows to slide in one direction. The ring 260 is of a configuration that is identical to that of the first embodiment. The clevis 272 is of a configuration that is similar to that of the first embodiment. In this embodiment it bears against the bar via an annular bead.

The operation and the behavior of the link are identical to the operation and the behavior of the first embodiment.

Figure 9:
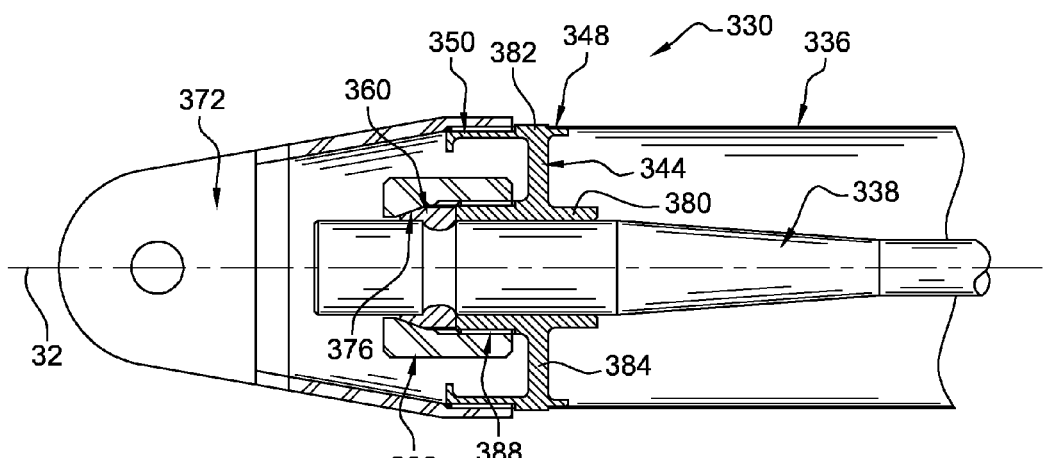

A third embodiment is shown in FIG. 9. Once more, the inner composite portion 338 is made in the form of a bar.

Over its entire length the metal covering 336 is cylindrical in shape and its cross-section remains unchanged.

The spacer 344 in this embodiment comprises a hub 380 and a skirt 382 peripherically spaced apart from the hub and facing it. The hub and the skirt are connected together by a plane web 384 perpendicular to the axis 32. The faces 350 and 348 are outside faces of the skirt.

In this embodiment, the clevis 372 is rigidly fastened to the spacer 344 without contributing to fastening the bar 338 thereto. For this purpose, the clevis 372 is screwed directly onto the threaded outer face 350. The other outer face 348 carries the covering 336 so that it is prevented from sliding axially towards the clevis, but it is free to slide in the opposite direction relative to the spacer.

As in the above-described embodiments, the ring 360 is rigidly fastened by complementary shapes to the bar 338 and in this embodiment is in axial abutment against the hub 380 of the spacer 344.

The end of the link has a nut 386 that is independent of the other parts, that is engaged on the bar, and that is screwed directly onto an outer face 388 of the hub 380. In this embodiment it is the nut that carries the frustoconical face 376 that bears against the frustoconical face of the ring 360. The nut 386 may be made of a metal such as steel or titanium. The nut 386 thus serves to hold the spacer 344, the ring 360, and the bar 338 rigidly relative to one another. The skirt 382 and the hub 380 form a cavity that receives a portion of the nut. The clevis 372 co-operates with the spacer 344 to define an enclosure that receives the nut, the ring 360, and the end of the bar 338.

The operation and the behavior of the link in this embodiment are identical to the operation and the behavior of the first embodiment.

Figure 10:
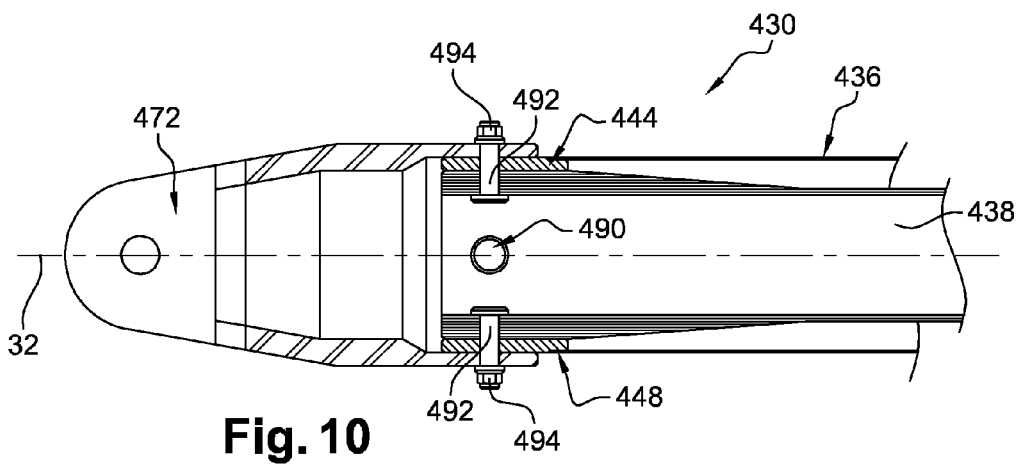

The clevis 472 of the fourth embodiment as shown in FIG. 10 is of a configuration close to that of the first embodiment as shown in FIG. 7. However, the abutment-forming ring is omitted. The clevis 472 is engaged on the outer face 150 of the spacer 444 without being screwed thereon, their contacting faces being smooth. Radial orifices 490 are formed in the inner composite tube 438, the spacer 444, and the clevis 472 so as to form several groups of coinciding orifices, there being four of these groups, for example. Each of these groups of orifices receives a fastener element such as a nut 494 and a bolt 492 that are inserted to fasten these parts rigidly together. As above, the metal covering 436 is carried by the outer face 448 of the spacer 444 and is free to slide away therefrom in the axial direction.

In each of these embodiments, if the metal tube is damaged, it may be replaced by dismantling the link. The clevis in each embodiment is suitable for being dismantled. This provides a substantial advantage insofar as the metal tube is generally much less expensive than the tube or the bar made of composite material. In each of these embodiments, the tube or the bar made of composite material is protected from impacts and from chemical attack inside the link. It is thus possible for it to work with a level of elongation that is greater than that which would be possible if it were exposed at the outside of the link.

With a link in accordance with any of the above embodiments, and for given traction performance, the weight saving achieved by the link lies in the range 22% to 26% relative to a link made entirely out of composite material, and in the range 44% to 48% relative to a link made entirely out of metal. The saving relative to a metal link may even be greater if the fatigue criterion is taken into account. These calculations are the result of analyses performed using the following values:

for the composite link, a thickness of 4.3 mm, a middle outside diameter of 49 mm, this link forming the reference weight;

for the metal link, a thickness of 3.4 mm, a middle outside diameter of 44 mm, thereby giving 22% additional weight;

for a hybrid link with a bar, a bar diameter of 19 mm, a metal tube thickness of 0.7 mm, and an outside diameter of the tube of 41 mm, thereby obtaining a weight reduction of 26%; and for a hybrid link using a composite tube, a tube thickness of 3.3 mm, an outside diameter of the composite tube of 30 mm, an aluminum tube thickness of 0.7 mm, and an outside diameter thereof of 51 mm, thereby giving a reduction in weight of 22%.

When the link is subjected to compression forces that are small compared with the length of the link (the link not being dimensioned in buckling), the weight saving of the hybrid link is 28% relative to a metal link and 32% relative to a composite material link. The values that give this result are as follows:

composite link: thickness 4.2 mm, middle outside diameter 66 mm, weight constituting the reference weight;

metal link: thickness 2.9 mm, middle outside diameter 54 mm, weight reduction 5%;

hybrid link with a bar: bar diameter 17 mm, aluminum tube thickness 0.7 mm, and outside diameter of the tube 86 mm, thereby obtaining a weight reduction of 33%; and hybrid link using a composite tube: thickness of the tube 2.1 mm, outside diameter of the composite tube 44 mm, thickness of the aluminum 0.7 mm, and outside diameter of the aluminum tube 65 mm, thereby obtaining a weight reduction of 37%.

Figure 11:
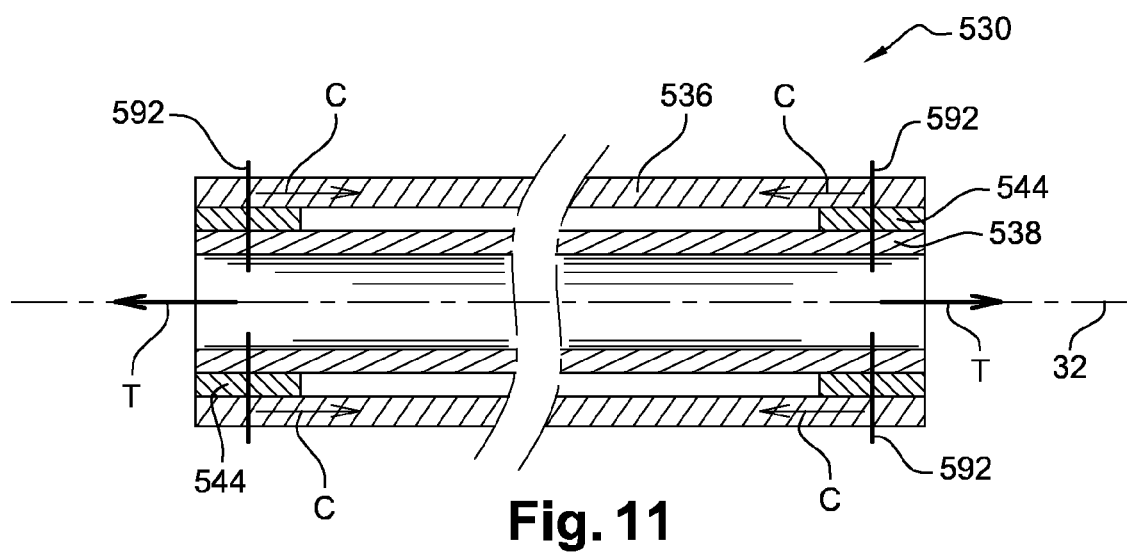

A fifth embodiment of the link is described below, as shown in FIG. 11.

It can be seen that the link 530 comprises an outer metal tube 536 and an inner portion 538 made of composite material, another tube in this example, together forming a middle segment of the link, with both being present in any section of the middle segment in a plane perpendicular to the longitudinal direction 32. The two tubes are coaxial and arranged without mutual contact.

In this embodiment, the two portions made of composite material and of metal are fastened to each other without it being possible for the metal portion 536 to slide relative to the other portion 538.

Furthermore, the two portions are assembled together in such a manner that the portion 538 made of composite material is subjected to tension stress T along the longitudinal direction 32 in the middle portion of the link when the link is at rest. The metal portion 536 against which the composite material bears is therefore subjected in its middle segment to compression stress C along the same direction when the link is at rest. These stresses, which are in balance at rest, are arbitrarily localized in FIG. 11 for clarity in the figure, it being understood that they apply over the major fraction of the part in question, and in particular in the middle segment. These stresses are maintained at least in part by fastener members 592 fastening the parts 536 and 538 together and to the spacers 544.

Thus, instead of making provision for the metal portion to slide in one direction relative to the end of the link (in order to avoid stressing said portion in traction), in this embodiment provision is made for the composite portion 538 to be subjected to pre-tension on assembly, thereby enabling the metal portion 536 to be prestressed in compression.

The advantages of such a solution are to make the metal portion 536 work when the link is stressed in traction under normal circumstances of utilization and operation. Since the metal portion is prestressed, it takes up a fraction of the traction forces applied to the link without reaching a critical state, whether in terms of static strength or fatigue strength. With the metal portion taking up a fraction of the forces, the composite portion is loaded more lightly while the link is being stressed.

Apart from these features that are specific to this embodiment, the link may be constituted in the same manner as any of the above-described embodiments, e.g. the embodiment shown in FIG. 10. The lack of freedom to move also makes it possible to reduce the number of parts making up the link and thus to simplify its structure.

Figure 12:
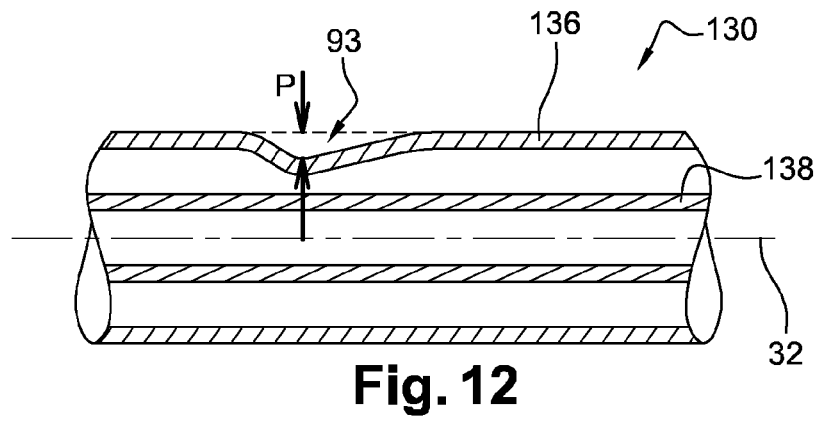
FIGS. 12 and 13 are views of a middle segment of these links showing two impact situations.
Figure 13:
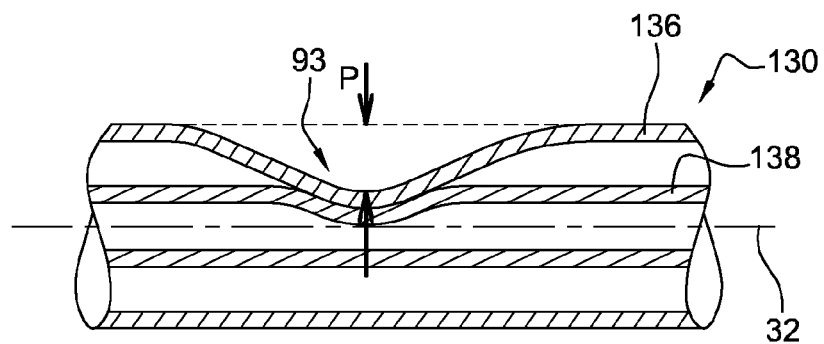

In each of these embodiments, the link also has the advantage of behaving in the manner described below with reference to FIGS. 12 and 13. These figures use the numerical references of the link 130 of the first embodiment, but the link could be any of the other links.

The inner portion 138 of composite material is received in the metal outer portion 136, thereby protecting it to a considerable extent against impacts. If an impact occurs on the outer portion 136, the element that strikes the link makes an indentation 93 that forms a singularity in the outer face of the outer portion. This indentation can be seen from outside the link and thus enables an inspector to see that an impact has occurred, with the indentation constituting the trace of that impact. This provides a method of inspecting the link before or after fitting to the aircraft, and indeed during its lifetime. In order to perform this method, it is determined whether the outer face of the outer portion 136 presents an indentation 93. The indentation may be of arbitrary shape, forming a crater, a dent, etc.

In an advantageous implementation of this method, a depth p of the indentation is measured in a direction radial to the axis 32, and this measured depth is compared with a predetermined threshold. The threshold is selected so that it is equal to the distance between the outer faces of the outer and inner portions 136 and 138 (on the same side of the axis), minus the thickness of the wall of the outer portion. Thus, so long as the depth p is less than the threshold, as shown in FIG. 12, it is known that the inner portion has not been damaged by the impact, since the outer portion has not come into contact therewith. Conversely, when the depth p is greater than the threshold, as shown in FIG. 13, it is known that the inner portion has been damaged by the impact, since the outer portion has come into contact therewith. When visual inspection reveals that an impact has occurred, it is thus possible to determine the severity of the damage and to decide on the most appropriate measures to be taken.

This protection effect and this method are particularly advantageous when the inner portion is the portion made of composite material, but they are not restricted thereto.

In each of these embodiments, it is possible in a variant to provide a layer of deformable material 95 that is interposed between the inner and outer portions 136 and 138 of the link, which material is suitable for absorbing mechanical deformation as to limit its transmission from the outer portion to the inner portion. The material is shown in the bottom portion of FIG. 12 to illustrate this variant. By way of example, this layer may occupy the entire space between the two portions and may be in contact with both of them. This material provides the inner portion with additional protection when the outer portion is subjected to an impact.

By way of example, the material may be a natural or a synthetic elastomer.

The material may also be a cellular material such as a rigid solid foam. By way of example, the foam may be based on polymetacrilimide. By way of example, it is possible for this purpose to use the material sold under the trademark Rohacell® by Evonik Industries.

Naturally, numerous modifications may be made to the invention without going beyond the ambit thereof.

Provision may be made for the composite material and metal portions to be rigidly fastened to each other (thus without any freedom for the metal portion to slide relative to the other) without either of them being prestressed when the link is at rest.

What is claimed is:

1. A link for an aircraft, the link comprising:
at least two portions respectively made of metal and of composite material together forming a middle segment of the link with both being present in any section of the middle segment in a plane perpendicular to a longitudinal direction of the link, and
end parts located at opposite ends of the middle segment, the middle segment extending between the end parts,
wherein the at least two portions are spaced apart from each other in the middle segment by spacer elements engaging the end parts, whereby the two portions have no region of mutual contact,
wherein each of the end parts includes a connector configured to be connected to a structure or other part of the aircraft, at least one of the connectors including an inclined face arranged to urge a corresponding ring in abutment with a corresponding one of the spacer elements, which is prevented from sliding relative to the composite portion in either of two opposite longitudinal directions, and
wherein the at least two portions are arranged to face each other in the middle segment with no material whatsoever between them in the middle segment.

2. The link according to claim 1, wherein one of the portions extends inside the other portion.

3. The link according to claim 1, wherein the composite material portion extends inside the metal portion.

4. The link according to claim 1, wherein each of the two portions is in the form of a body of revolution about a longitudinal axis of the link.

5. The link according to claim 2, wherein the inner portion is hollow.

6. The link according to claim 2, wherein the inner portion is solid.

7. The link according to claim 1 having at least one of the end parts fastened to the portions without coming directly into contact with either of them.

8. The link according to claim 1, wherein the metal portion is mounted to be slidably movable relative to an end of the link in the longitudinal direction locally away from said end, the link having an abutment against the metal portion sliding in the opposite direction.

9. The link according to claim 1, wherein the connector urging the corresponding ring in abutment with the at least one spacer bears against the ring via a face that is inclined relative to a longitudinal axis of the link.

10. The link according to claim 9, wherein the end part is a clevis.

11. The link according to claim 9, wherein each of the end parts is a nut that is distinct from the end part of the link and that is screwed onto a spacer interposed between the metal and composite material portions radially relative to a longitudinal axis of the link.

12. The link according to claim 1, arranged in such a manner that the composite material portion is subjected in the middle segment to tension stress in the longitudinal direction when the link is at rest.

13. An aircraft including a plurality of links according to claim 1, the plurality of links together forming a trellis structure, wherein the links are identical to one another and they are distributed in several groups of links, the links in each group being coplanar, mutually parallel and spaced apart from one another, the links from different groups being in different planes.

14. A link for an aircraft comprising:
a middle body having an axis and including a metal sleeve enclosing and coaxial with a composite material beam, wherein the metal sleeve and composite material beam both extend an entire length of the middle body;
spacer elements between the metal sleeve and the composite material beam, wherein the spacer elements form a gap between the metal sleeve and the composite material beam which extends the entire length of the middle body, and
end parts at opposite ends of the middle body and aligned with the axis of the middle body, the middle body extending between the end parts, wherein each of the end parts includes a connector configured to be connected to a structure or other part of the aircraft,
at least one connector including an inclined face arranged to urge a corresponding ring in abutment with a corresponding one of the spacer elements, which is prevented from sliding relative to the composite portion in either of two opposite longitudinal directions, and
wherein the metal sleeve and composite material beam are arranged so as to be spaced apart and facing each other in the middle body with no material whatsoever between them in the middle body.

15. The link of claim 14 wherein the composite material beam is a hollow tube having a circular cross section.

16. The link of claim 14 wherein the spacer element includes a radially inward surface abutting an outer surface of the composite tube and an radially outward surface abutting a radially inward surface of the metal sleeve.

17. A link for an aircraft, the link comprising:
a middle segment comprising a portion made of metal and a portion made of composite material;
connectors located at opposite ends of the middle segment, the middle segment extending between the connectors; and
a plurality of spacers separating the two metal and composite portions from each other so as to form a gap between the two portions with no region of mutual contact between the two portions;
the plurality of spacers being rigidly fastened to the connectors and the composite portion and slidably engaging the metal portion, whereby any axial traction force applied to the connectors is transmitted to the spacers and the composite portion and not to the metal portion so that only the composite tube withstands the axial traction force;
each of the connectors including a corresponding face arranged to urge a corresponding ring in abutment with a corresponding one of the plurality of spacers when a compression force is applied to the connector, each of the spacers including a shoulder which slidably engages the metal portion when the compression force is applied to the connectors and thus transmitted to the corresponding spacers, whereby both the composite portion and the metal portion withstand the compression force.

18. A link for an aircraft, the link comprising:
a middle segment comprising a portion made of metal and a portion made of composite material;
connectors located at opposite ends of the middle segment, the middle segment extending between the connectors; and
a plurality of spacers separating the two metal and composite portions from each other so as to form a gap between the two portions with no region of mutual contact between the two portions;
each of the connectors being threaded onto a corresponding one of the plurality of spacers and having a frustoconical face arranged to come into surface-on-surface contact against a corresponding ring which is in abutment with the corresponding spacer, the corresponding spacer making surface-on-surface contact with the composite portion and slidably engaging the metal portion so that each connector, its corresponding spacer and ring and the composite portion are rigidly fastened together
whereby any axial traction force applied to the connectors is transmitted to the spacers and the composite portion and not the metal portion so that only the composite portion withstands the axial traction force; and
whereby, when a compression force is applied to the connectors and thus transmitted to the spacers, both the composite portion and the metal portion withstand the compression force.

19. A link for an aircraft, the link comprising:
at least two portions respectively made of metal and of composite material, together forming a middle segment of the link with both being present in any section of the middle segment in a plane perpendicular to a longitudinal direction of the link, and
end parts located at opposite ends of the middle segment, the middle segment extending between the end parts, and
wherein the two portions are spaced apart from each other in the middle segment and have no region of mutual contact, the distance between the two portions being constant over a majority of the length of the link, and
wherein each of the end parts includes a connector configured to be connected to a structure or other part of the aircraft, at least one of the connectors including an inclined face arranged to urge a corresponding ring in abutment with a corresponding spacer element serving to space apart the two portions from each other, the spacer element making surface-on-surface contact with the composite material portion so as to be prevented from sliding relative to the composite material portion in either of two opposite longitudinal directions.

\* \* \* \* \*